US006767986B2

(12) United States Patent
Moethrath et al.

(10) Patent No.: US 6,767,986 B2
(45) Date of Patent: Jul. 27, 2004

(54) PRODUCTION AND USE OF HIGH MOLECULAR WEIGHT ALIPHATIC POLYCARBONATES

(75) Inventors: Melanie Moethrath, Düsseldorf (DE); Lothar Bunzel, Kempen (DE); Hans Deml, Krefeld (DE); Wolfgang Ebert, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 47 days.

(21) Appl. No.: 10/420,150

(22) Filed: Apr. 22, 2003

(65) Prior Publication Data

US 2003/0204042 A1 Oct. 30, 2003

(30) Foreign Application Priority Data

Apr. 29, 2002 (DE) ........................................ 102 19 028

(51) Int. Cl.[7] .............................................. C08G 64/00
(52) U.S. Cl. ...................... 528/196; 264/219; 502/150; 525/460; 525/461; 528/198
(58) Field of Search ........................ 264/219; 502/150; 525/460, 461; 528/196, 198

(56) References Cited

U.S. PATENT DOCUMENTS

| 3,161,615 A | 12/1964 | Goldberg ..................... 260/47 |
| 4,054,597 A | 10/1977 | Krimm et al. ............... 260/463 |
| 4,105,641 A | 8/1978 | Buysch et al. ............... 526/712 |
| 4,217,437 A | 8/1980 | Schreckenberg et al. ... 528/171 |
| 4,754,017 A | 6/1988 | Leitz et al. .................. 528/371 |

FOREIGN PATENT DOCUMENTS

| DE | 1 031 512 | 6/1958 |
| DE | 24 47 349 | 4/1976 |
| DE | 25 46 534 | 4/1977 |
| DE | 41 09 236 | 9/1992 |
| DE | 100 27 907 | 12/2001 |
| EP | 1 134 248 | 9/2001 |

*Primary Examiner*—Terressa Boykin
(74) *Attorney, Agent, or Firm*—Joseph C. Gil; Aron Preis

(57) ABSTRACT

A process for the production of high molecular weight aliphatic polycarbonates is disclosed. The process entails a first stage wherein a low molecular weight aliphatic polycarbonate is prepared and a second stage where the low molecular weight aliphatic polycarbonate is condensed with diaryl carbonate in a melt transesterification process to form a high molecular weight aliphatic polycarbonate. The resulting high molecular weight aliphatic polycarbonate is suitable for the production of extrudates, films and molded articles.

8 Claims, No Drawings

PRODUCTION AND USE OF HIGH MOLECULAR WEIGHT ALIPHATIC POLYCARBONATES

FIELD OF THE INVENTION

The present invention relates to high molecular weight aliphatic polycarbonates and a process for their manufacture.

SUMMARY OF THE INVENTION

A process for the production of high molecular weight aliphatic polycarbonates is disclosed. The process entails a first stage wherein a low molecular weight aliphatic polycarbonate is prepared and a second stage where the low molecular weight aliphatic polycarbonate is condensed with diaryl carbonate in a melt transesterification process to form a high molecular weight aliphatic polycarbonate. The resulting high molecular weight aliphatic polycarbonate is suitable for the production of extrudates, films and molded articles.

BACKGROUND OF THE INVENTION

The production of low molecular weight diol-terminated aliphatic polycarbonates on an industrial scale as feedstocks for the production of polyurethanes is known.

Thus, the production of low molecular weight diol-terminated aliphatic polycarbonates in homogeneous phase from chlorinated carbonic acid esters and aliphatic diols is described for example in DE 2 447 349 A. The production of such polycarbonates in the phase boundary process from chlorinated carbonic acid esters and aliphatic diols is described for example in DE 2 446 107 A. In addition DE 2 523 352 A, DE 2 546 534 A and DE 10 027 907 A1 for example describe the production of such polycarbonates in a transesterification process from carbonic acid esters and aliphatic diols.

All these processes have in common the feature that the maximum weight-average molecular weights $M_w$ of the polymers are 15,000 to 20,000 g mol$^{-1}$. Preferred molecular weights for industrial use as feedstocks in the production of polyurethanes are between 350 and 3000 g mole$^{-1}$.

Further reaction of the low molecular weight polycarbonate polymers that can be obtained in this way to form high molecular weight, purely aliphatic polycarbonates has not hitherto been described, although it would be very useful on account of the considerably more favorable cost structure due to the use of cheaper monomers to replace aromatic high molecular weight polycarbonates by corresponding aliphatic raw materials.

High molecular weight polycarbonates with aliphatic polycarbonate blocks have up to now been described only in a few special cases. For example, EP 000 060 A1 describes the production of high molecular weight polyether co-polycarbonates. In this case low molecular weight polyalkylene oxide diols are converted to bischlorocarbonic acid monoaryl esters extended via carbonate groups. These are reacted further with bisphenols to form polyalkylene oxide diol bis-diphenol carbonates extended via carbonate groups, which are then condensed in the phase boundary process with phosgene and bisphenols to form polyether polycarbonates. Polymers with maximum mean molecular weights of 250,000 g mole$^{-1}$ are obtained by this complicated three-stage process. A disadvantage is the fact that the aliphatic starting compounds are restricted to polyalkylene oxide diols. Furthermore it is not possible to produce high molecular weight, purely aliphatic polycarbonates in this way.

U.S. Pat. No. 3,161,615 described the production of high molecular weight 1,6-hexanediol copolycarbonates. In a first step a low molecular weight 1,6-hexanediol polycarbonate is formed by reacting 1,6-hexanediol with phosgene in pyridine, the resultant polycarbonate then being reacted further with bisphenol A and phosgene. However, it is not possible to produce high molecular weight, purely aliphatic polycarbonates in this way either.

A disadvantage in both these cases is furthermore the fact that the use of phosgene for industrial reaction purposes is difficult and complicated having regard to the considerable safety risks and high material costs due to corrosion.

DE 1 031 512 describes the production of high molecular weight aliphatic polycarbonates. In order for the reaction of for example 1,6-hexanediol and diethyl carbonate under alkali catalysis to yield high molecular weight aliphatic polycarbonates, a base-binding substance such as for example phenyl chloroformate must be added to the reaction in the oligomer range. A disadvantage has proved to be the fact that, after the neutralization of the catalyst, the transesterification can be continued only to a limited extent. From the applicants' own experiments it is known that the achievable molecular weight is limited to approximately 28,000 g mole$^{-1}$. However, the polymers have useful viscoplastic properties only above this molecular weight. Moreover, the production of mixed aliphatic polycarbonates according to this process is not described.

The production of high molecular weight linear aliphatic polycarbonates from cyclic aliphatic carbonates is described in EP 0 236 862 A2. Cyclic aliphatic carbonates are polymerized in a ring-opening solution polymerization with organometallic catalysts, such as for example butyllithium, in the presence of aprotic organic solvents to form polycarbonates. Polymers with molecular weights of up to 120,000 g mole$^{-1}$ can be obtained in this way. A disadvantage with relatively large-scale batch production is that this process has to be carried out by an exothermic polymerization under the absolute exclusion of atmospheric oxygen and moisture and at temperatures of –50° to 0° C. The range of commercially available cyclic aliphatic carbonates is however limited to a few special compounds such as for example ethylene carbonate, propylene carbonate and neopentyl glycol carbonate. A production of mixed aliphatic polycarbonates is not possible according to this process.

Against the background of the prior art the problem therefore exists of providing an uncomplicated process for the production of high molecular weight aliphatic polycarbonates containing aliphatic polycarbonate blocks that is suitable for a large number of various aliphatic diols as starting materials and at the same time offers the possibility of producing mixed high molecular weight aliphatic polycarbonates.

This object has surprisingly been solved by the two-stage production process according to the invention.

DETAILED DESCRIPTION OF THE INVENTION

The present invention provides a process for the production of aliphatic polycarbonates containing aliphatic polycarbonate blocks. In the first stage of the process characterize a low molecular weight aliphatic polycarbonate is prepared, which polycarbonates are in a second stage is condensed according to the melt transesterification process to form high molecular weight aliphatic polycarbonates.

Low molecular weight aliphatic polycarbonates in the present context have a mean, weight-average molecular weight of 300 to 20,000 g mole$^{-1}$. High molecular weight aliphatic polycarbonates are those having a mean weight average molecular weight of 20,000 to 500,000 g mole$^{-1}$. These values are to be regarded as exemplary and not exclusive.

Within the context of the present invention the molecular weight or mean molecular weight of oligopolymers or polymers is always understood to be the weight-average molecular weight unless specifically stated otherwise.

The aliphatic polycarbonates are identified above and hereinafter as those with aliphatic groups at the carbonate oxygen atom bonds. These aliphatic groups may however be coupled entirely via aromatic groups/radicals as long as no aromatic groups are directly bound to the carbonate oxygen atom bonds.

As processes for the production of the low molecular weight aliphatic polycarbonates in the first stage of the process according to the invention, there may in principle be used all processes known in the prior art for the production of polycarbonate diols. Such processes are described for example in the following applications: DE 1 915 908 A, DE 2 447 349 A, DE 2 446 107 A, DE 10 027 907 A1, EP 1 018 504 A, WO 95 22 749 A, EP 292 772 B1 and EP 1 134 248. However, those processes in which the production of the aliphatic polycarbonates is carried out without the use of phosgene are preferred. These include in particular transesterification processes with carbonic acid diesters, such as are described in DE 1 915 908 A, DE 10 027 907 A1, DE 2 546 534 A, DE 2 523 352 A and EP1 018 504 A.

According to the process of the invention, the low molecular weight aliphatic polycarbonates are mixed in a second stage in an inert gas atmosphere with diaryl carbonate and optionally aliphatic diols and are condensed in the presence of a catalyst and under reduced pressure at temperatures of up to 150° to 320° C., preferably 160° to 280° C. and particularly preferably between 180° and 220° C., and the hydroxyaryl component thereby formed is distilled off. At all times the pressure is selected so that the hydroxyaryl component may be distilled off without any problem. This pressure may vary from 1000 mbar up to the high vacuum range, depending on the component that is to be distilled off.

The present invention also provides the high molecular weight aliphatic polycarbonates per se that are obtainable in this way, which are characterized by a good property profile, namely a good viscoplastic behavior with a weight-average molecular weight $M_w$ of at least 30,000 g mole$^{-1}$, preferably 35,000 g mole$^{-1}$, and the use of these polycarbonates for the production of extrudates, films and molded articles, and these extrudates, films and molded articles per se.

The radical definitions, parameters and explanations given above or hereinafter in general terms or in preferred ranges may also be combined arbitrarily with one another, i.e. between the respective ranges and preferred ranges. They apply as appropriate to the end products as well as to the precursors and intermediate products and for processes as well as process steps.

For the first stage of the process according to the invention suitable aliphatic diols are those of the formula (I)

H[O—T—]$_n$OH    (I)

wherein n is a number between 1 and 100, preferably 1 to 80 and particularly preferably 1 to 45, and T denotes a branched or linear, saturated or unsaturated alkyl or cycloalkyl radical containing 3 to 20 carbon atoms. Preferred are saturated, linear alkyl diols with 3 to 15 carbon atoms, particularly preferably with 3 to 10 carbon atoms, most particularly preferably with 6 to 10 carbon atoms and especially also with 7 to 10 carbon atoms.

The following may be mentioned by way of example but not exclusively: 1,7-heptanediol, 1,8-octanediol, 1,6-hexanediol, 1,5-pentanediol, 1,4-butanediol, 1,3-propanediol, 2-methyl-1,3-propanediol, 3-methyl-1,5-pentanediol, 2-methylpentanediol, 2,2,4-trimethyl-1,6-hexandediol, 2-ethyl-1,6-hexanediol, 2,3,5-trimethyl-1,6-hexanediol, cyclohexanedimethanol, neopentyl glycol, etc. and polyethylene glycol, polypropylene glycol, polybutylene glycol as well as polyether polyols that have been obtained by copolymerisation of for example ethylene oxide and propylene oxide, or polytetramethylene glycol that has been obtained by ring-opening polymerisation of tetrahydrofuran (THF), and dihexyl ether glycol, trihexyl ether glycol and tetrahexyl ether glycol as well as mixtures of various diols.

There may furthermore be used addition products of the diols described in formula (I) with lactones (ester diols) such as for example caprolactone, valerolactone, etc., as well as mixtures of the diols with lactones, an initial transesterification of lactones and diols not being necessary.

There may also be used the addition products of the diols described in formula (I) with dicarboxylic acids such as for example: adipic acid, glutaric acid, succinic acid, malonic acid, etc., or esters of the dicarboxylic acids as well as mixtures of the diols with dicarboxylic acids and/or esters of the dicarboxylic acids, an initial transesterification of dicarboxylic acid and the diols not being necessary.

Mixtures of various diols, lactones and dicarboxylic acids may also be used.

1,6-hexanediol, 1,5-pentanediol and mixtures of 1,6-hexanediol and caprolactone are preferably used in the process according to the invention.

1,6-hexanediol is particularly preferably used.

Suitable carbonate components for the first stage of the process according to the invention are diaryl carbonates, dialkyl carbonates, alkylene carbonates, dioxolanones, alkyldiol bischlorocarbonic acid esters, phosgene or urea. Diaryl carbonates and dialkyl carbonates are preferred.

Diphenyl carbonate and dimethyl carbonate are particularly preferred.

As catalysts there may in principle be used all known soluble catalysts for transesterification reactions (homogeneous catalysis), as well as heterogeneous transesterification catalysts. The first stage of the process according to the invention is preferably carried out in the presence of catalysts.

Particularly suitable for the process according to the invention are hydroxides, oxides, metal alcoholates, carbonates and organometallic compounds of metals of main groups I, II, III and IV of the periodic system of the elements, of subgroups III and IV, as well as the elements of the rare earth group, in particular compounds of Ti, Zr, Pb, Sn and Sb.

The following may for example be mentioned: LiOH, Li$_2$CO$_3$, K$_2$CO$_3$, KOH, NaOH, KOMe, NaOMe, MgOH, MgCO$_3$, MeOMgOAc, CaO, BaO, KOt-Bu, TiCl$_4$, titanium tetraalcoholates or terephthalates, titanium tetraalkyls, zirconium tetraalcoholates, tin octanoates, dibutyltin dilaurate, dibutyltin oxide, dibutyltin methoxide, bistributyltin oxide, dibutyltin laurate, tin oxalates, lead stearates, antimony trioxide, zirconium tetra-isopropylate, tin, etc. Inorganic or organic acids such as for example phosphoric acid, acetic acid, p-toluenesulfonic acid may furthermore be used as catalysts.

Furthermore, in the first stage of the process according to the invention there may be used tertiary amines of the formula $R_1R_2R_3N$ where $R_{1-3}$ denotes $C_1$-$C_{30}$-hydroxyalkyl, -aryl or -alkyl, in particular trimethylamine, triethylamine, tributylamine, N,N-dimethylcyclohexylamine, N,N-dimethylethanolamine,1,8-diazabicyclo-(5.4.0)undec-7-ene, 1,4-diazabicyclo-(2.2.2)octane, 1,2-bis(N,N-dimethylamino)ethane, 1,3-bis(N,N-dimethylamino) propane and pyridine.

There are preferably used the alcoholates, carbonates and hydroxides of sodium, potassium and magnesium (NaOH, KOH, KOMe, NaOMe, MgOH, $MgCO_3$), the alcoholates, alkylates and carbonates of titanium, tin or zirconium (e.g. $Ti(OPr)_4$), as well as organotin compounds (e.g. bistributyl-tin oxide), the titanium, tin and zirconium tetraalcoholates preferably being used in the case of diols that contain ester functions and/or in the case of mixtures of diols with lactones.

The catalysts are preferably used in amounts of 0.00001 to 2.0 wt. %, preferably 0.00005 to 1.3 wt. % and particularly preferably 0.0001 to 0.8 wt. %, referred to the aliphatic diols that are used.

After the end of the reaction the catalyst may be left in the product, separated, neutralized or masked. The catalyst is preferably left in the product.

The aliphatic diols that are used as well as the other raw materials, added chemicals and auxiliary substances that are used should obviously be as pure as possible.

The first stage of the process according to the invention may be carried out continuously or batchwise.

The first stage of the process according to the invention need not be connected as regards apparatus or physically to the second stage of the process according to the invention, as long as the low molecular weight polycarbonates that are obtained after the first stage of the process according to the invention are used for the production of high molecular weight aliphatic polycarbonates.

In an alternative embodiment of the process according to the invention the high molecular weight aliphatic polycarbonates are produced from commercially obtainable low molecular weight aliphatic polycarbonates that correspond to the low molecular weight aliphatic polycarbonates otherwise produced in the first process stage. Accordingly the present invention also relates to a process for the production of high molecular weight aliphatic polycarbonates from low molecular weight aliphatic polycarbonates by a melt transesterification process corresponding to the second stage of the previously described main process according to the invention.

The first stage of the process according to the invention may be carried out according to a melt process, with and without solvent, or in solution, and homogeneously or in a phase boundary process.

By way of example but not exclusively there may be mentioned aqueous alkaline solutions. All alkali metal and alkaline earth metal hydroxides that are soluble or dispersible in water may be used as alkali components, preferably however sodium hydroxide, potassium hydroxide, magnesium hydroxide and/or calcium hydroxide (slurry of calcium oxide in water) or their mixtures.

The following may also be mentioned by way of example but not exclusively as solvents in the first stage of the process according to the invention: aromatic hydrocarbons such as toluene, xylene, ethylbenzene, cumene, 1,2,4-trimethylbenzene, mesitylene, tetramethylbenzene, cymene, diethylbenzene, diisopropylbenzene, chlorotoluene, bromobenzene or tetralin, olefins such as propylenebenzene, allylbenzene or α-methylstyrene, ethers such as diethyl ether, dipropyl ether, dibutyl ether, diisopropyl ether, diisobutyl ether, diamyl ethers, anisole, phenetol or cresol methyl ether, and ketones such as dibutyl ketone, di-tert.-butyl ketone or diamyl ketone, decane, dodecane, tridecane, dimethyloctane, white spirit, halogenated hydrocarbons such as chlorobenzene, dichlorobenzene, methylene chloride, chloroform, trichloropropane, tetrachloroethane, chloronaphthalene, ethylcyclohexane, isopropylcyclohexane, decalin, styrene or indene.

Mixtures of various solvents may also be used.

The first stage of the process according to the invention is preferably carried out in a melt process, particularly preferably free of solvents.

The first stage of the process according to the invention may optionally be carried out in the presence of inert gases. By way of example but not exclusively there may be mentioned nitrogen, helium, hydrogen, methane, ethane, propane, carbon monoxide, but preferably nitrogen or carbon dioxide.

The first stage of the process according to the invention is generally carried out at temperatures between 0° and 320° C., preferably between 10° and 275° C. and particularly preferably between 20° and 220° C., and at pressures of 1 to 0.001 bar (high vacuum).

The temperature and pressure ranges may in certain circumstances also differ from the values specified hereinbefore, depending on the substances and compounds that are used and formed.

According to the process of the invention, in the first stage the educts are mixed in the presence of a catalyst in an inert gas atmosphere, and are heated while constantly mixing under normal pressure over a period of 0.01 to 7 hours, preferably 0.05 to 6 hours, particularly preferably 0.5 to 5 hours, at a temperature of 140° to 260° C., preferably 155° to 220° C. and particularly preferably 170° to 200° C. The alcohol released is then distilled off by increasing the temperature stepwise up to 230° C., preferably up to 220° C. and particularly preferably up to 210° C. In this connection the temperature is chosen so that the released alcohol can always be distilled off without any problem. Following this the pressure is reduced so that residues of the alcohol component formed can be removed without any problem from the reaction mixture, and overall the theoretically possible amount of released alcohol component is distilled off. After completion of the reaction the mixture is cooled to 110°–50° C., preferably 100°–60° C., particularly preferably 90°–70° C., and is then aerated.

The molecular weight of the low molecular weight aliphatic polycarbonates produced in the first stage of the process according to the invention is adjusted via the ratio of diol to carbonate component. In general quantitative ratios are used such that polycarbonates are formed having molecular weights of 260 to 20,000 g mole$^{-1}$, preferably between 300 and 7,300 g mole$^{-1}$ and particularly preferably between 350 and 3,000 g mole$^{-1}$.

The first stage of the process according to the invention enables low molecular weight polycarbonates of the formula II to be produced containing between 7 and 1300 carbon atoms in the chain, preferably between 9 and 600 carbon atoms and particularly preferably between 11 and 300 carbon atoms, in which R1 denotes aliphatic diols containing between 3 and 50 carbon atoms in the chain, preferably between 4 and 40 carbon atoms and particularly preferably between 4 and 20 carbon atoms.

It is particularly preferred to produce a 1,6-hexanediol carbonate with a mean molecular weight of 1800 to 2200 g mole$^{-1}$.

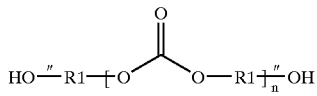
(II)

The diols may additionally contain ester, ether, amide and/or nitrile functions. Diols or diols with ester functions, such as are obtained for example by using caprolactone and 1,6-hexanediol, and also diols with ether functions, are preferably used. If two or more diol components are used (for example mixtures of various diols or mixtures of diols with lactones), then two adjacent R1 groups in a molecule may be completely different (random distribution).

For the synthesis of the high molecular weight aliphatic polycarbonates via the second stage of the melt transesterification, besides the low molecular weight aliphatic polycarbonates that can be produced according to the first process stage there may optionally be used aliphatic diols.

Suitable aliphatic diols for use in the second stage of the process according to the invention are those of the formula (I)

(I)

wherein n is a number between 1 and 100, preferably 1 to 80 and particularly preferably 1 to 45, and wherein T denotes a branched or linear, saturated or unsaturated alkyl or cycloalkyl radical with 2 to 40 carbon atoms, preferably saturated linear alkyl diols with 3 to 15 carbon atoms, particularly preferably with 3 to 10 carbon atoms, most particularly preferably with 6 to 10 carbon atoms and especially with 7 to 10 carbon atoms, as well as a radical (II)

(II)

wherein Al denotes branched or linear, saturated or unsaturated alkyl or cycloalkyl radicals with 2 to 40 carbon atoms and —O—Ar—O— denotes an aromatic radical with 12 to 24 carbon atoms derived from a bisphenol, preferably bisphenol A, bisphenol TMC or bisphenol M.

The following may be mentioned by way of example but not exclusively: 1,7-heptanediol, 1,8-octanediol, 1,6-hexanediol, 1,5-pentanediol, 1,4-butanediol, 1,3-propanediol, 2-methyl-1,3-propanediol, 3-methyl-1,5-pentanediol, 2-methylpentanediol, 2,2,4-trimethyl-1,6-hexandediol, 2,3,5-trimethyl-1,6-hexanediol, cyclohexanedimethanol, neopentyl glycol, dodecanediol, perhydrobisphenol A, spiro-undecane diols, ethoxylated or propoxylated bisphenols with aliphatic polyether polyols of different chain lengths as terminal groups, such as for example Dianole®, Newpole® and ethoxylated BP-TMC, ethoxylated or propoxylated resorcinols, hydroquinones, pyrocatechols with aliphatic polyether polyols of different chain lengths as terminal groups, polypropylene glycol, polybutylene glycol as well as polyether polyols that have been obtained by copolymerisation of for example ethylene oxide and propylene oxide, dihexyl, trihexyl and tetrahexyl ether glycol, etc., as well as mixtures of various diols.

There may furthermore be used addition products of the diols with lactones (ester diols) such as for example caprolactone, valerolactone, etc., as well as mixtures of the diols with lactones, an initial transesterification of lactones and diols not being necessary.

There may also be used addition products of diols with dicarboxylic acids such as for example adipic acid, glutaric acid, succinic acid, malonic acid, hydroxypivalic acid, etc., or esters of the dicarboxylic acids as well as mixtures of diols with dicarboxylic acids and/or esters of the dicarboxylic acids, in which connection an initial transesterification of dicarboxylic acid and the diols is not necessary but is possible. Poly(neopentyl glycol adipate) and hydroxypivalic acid neopentyl glycol ester may be mentioned by way of example but not exclusively.

The aliphatic diols are used in such an amount that, referred to the low molecular weight aliphatic polycarbonates, the sum total of added aliphatic diols and low molecular weight aliphatic polycarbonates in the resulting reaction mixture is 100 mole %. There may thus be used 0 to 99.9 mole %, preferably 20 to 90 mole % and particularly preferably 28 to 85 mole % of aliphatic diols, referred to the sum total of added aliphatic diols and low molecular weight aliphatic polycarbonates.

Mixtures of various diols, lactones and dicarboxylic acids and their addition products may also be employed. In this connection the added aliphatic diol or the mixtures of various diols, lactones and dicarboxylic acids may be identical or different from the aliphatic diol used in the first stage and from the mixtures of various diols, lactones and dicarboxylic acids that are used.

Diaryl carbonates are indispensably used for the synthesis of the high molecular weight aliphatic polycarbonates via the melt transesterification in the second stage of the process according to the invention. Diaryl carbonates in the context of the present invention are those carbonic acid diesters of the formula (III)

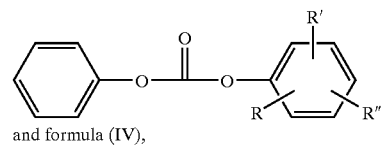
(III)

and formula (IV),

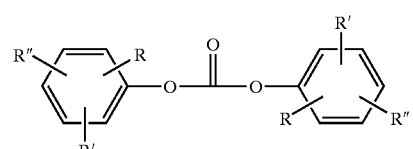
(IV)

in which R, R' and R" independently of one another denote H, optionally branched $C_1$–$C_{34}$-alkyl/cycloalkyl, $C_7$–$C_{34}$-alkaryl or $C_6$–$C_{34}$-aryl, for example diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl) carbonate, n-hexylphenyl-phenyl carbonate, di-(n-hexylphenyl) carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl) carbonate,
cumylphenyl-phenyl carbonate, di-cumylphenyl carbonate,
naphthylphenyl-phenyl carbonate, di-naphthylphenyl carbonate,
di-tert.-butylphenyl-phenyl carbonate, di-(di-tert.-butylphenyl) carbonate,
dicumylphenyl-phenyl carbonate, di-(dicumylphenyl) carbonate,
4-phenoxyphenyl-phenyl carbonate, di-(4-phenoxyphenyl) carbonate,
3-pentadecylphenyl-phenyl carbonate, di-(3-pentadecylphenyl) carbonate,
tritylphenyl-phenyl carbonate, di-tritylphenyl carbonate,
preferably
diphenyl carbonate,
tert.-butylphenyl-phenyl carbonate, di.-tert.-butylphenyl carbonate,
phenylphenol-phenyl carbonate, di-phenylphenol carbonate,
cumylphenyl-phenyl carbonate, di-cumylphenyl carbonate,
particularly preferably diphenyl carbonate.

The carbonic acid diesters are used in a ratio of 1:0.60 to 1.00, preferably 1:0.70 to 1:0.98, particularly preferably 1:0.75 to 1:0.95, referred to the sum total of the aliphatic diols and low molecular weight aliphatic polycarbonates. Mixtures of the aforementioned carbonic acid diesters may also be used.

For the synthesis of the high molecular weight aliphatic polycarbonates there may be used as catalysts in the second stage of the process according to the invention all soluble catalysts known for transesterification reactions (homogeneous catalysis), as well as heterogeneous transesterification catalysts. The second stage of the process according to the invention is preferably carried out in the presence of catalysts.

Particularly suitable for the process according to the invention are hydroxides, oxides, metal alcoholates, carbonates and organometallic compounds of metals of main groups I, II, III, IV and V of the periodic system of the elements, of sub-groups II, III and IV, as well as elements from the group of rare earth elements, in particular compounds of Ti, Zr, Pb, Sn, Zn, Bi, Ce and Sb. The following may be mentioned by way of example: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octanoates, dibutyltin dilaurate, dibutyltin oxide, dibutyltin methoxide, bistributyltin oxide, tin oxalates, tin-2-ethylhexanoate, zinc-2-ethylhexanoate, zirconium-2-ethylhexanoate, bismuth-2-ethylhexanoate, cerium-2-ethylhexanoate, lead stearates, antimony trioxide, zirconium tetra-isopropylate, etc. Furthermore inorganic or organic acids may be used as catalysts, such as for example phosphoric acid, acetic acid, p-toluenesulfonic acid.

Tertiary amines of the formula $R_1R_2R_3N$ where $R_{1-3}$ denotes $C_1$-$C_{30}$-hydroxyalkyl, -aryl or -alkyl may furthermore be used in the second stage of the process according to the invention, in particular trimethylamine, triethylamine, tributylamine, N,N-dimethylcyclohexylamine, N,N-dimethylethanolamine, 1,8-diazabicyclo-(5.4.0)undec-7-ene, 1,4-diazabicyclo(2.2.2)octane, 1,2-bis(N,N-dimethylamino)ethane, 1,3-bis(N,N-dimethylamino)propane and pyridine.

Ammonium or phosphonium compounds may also be used in the second stage of the process according to the invention.

Ammonium or phosphonium compounds within the context of the invention are those of the formulae (V) and (VI),

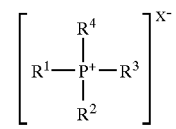
(V)

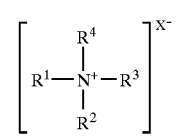
(VI)

wherein $R^{1-4}$ may be the same or different $C_1$–$C_{10}$-alkyls, $C_6$–$C_{10}$-aryls, $C_7$–$C_{10}$-aralkyls or $C_5$-$C_6$-cycloalkyls, preferably methyl or $C_6$–$C_{14}$-aryls, particularly preferably methyl or phenyl, and X may be an anion such as hydroxide, sulfate, hydrogen sulfate, hydrogen carbonate, carbonate, a halide, preferably chloride, or an alcoholate of the formula OR, wherein R may be $C_6$–$C_{14}$-aryl or $C_7$–$C_{12}$-aralkyl, preferably phenyl.

Preferred catalysts are:
tetramethylammonium hydroxide,
tetramethylammonium acetate,
tetramethylammonium fluoride,
tetramethylammonium tetraphenyl boranate,
tetramethylammonium phenolate,
dimethyldiphenylammonium hydroxide,
tetraethylammonium hydroxide,
tetraphenylphosphonium chloride,
tetraphenylphosphonium hydroxide,
tetraphenylphosphonium phenolate,
the alcoholates and oxides of titanium, tin or zirconium (e.g. $Ti(OPr)_4$, dibutyltin oxide), as well as organotin compounds.

Dibutyltin oxide is particularly preferably used.

After the completion of the reaction the catalyst may be left in the product or separated, neutralised or masked. The catalyst is preferably left in the product.

The catalysts are preferably used in amounts of 0.0001 to 0.8 mole %, referred to the sum total of aliphatic diols and low molecular weight aliphatic polycarbonates, and particularly preferably in amounts of 0.01 to 0.6 mole %.

The process according to the invention enables aliphatic polycarbonates to be produced having a weight-averaged molecular weight $M_w$ of at least 30,000 g $moles^{-1}$, built up from the repeating unit of the formula (VII)

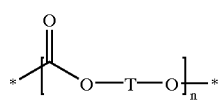
(VII)

wherein n is a number between 1 and 100, preferably 1 to 80 and particularly preferably 1 to 45, and
wherein T denotes a branched or linear, saturated or unsaturated alkyl or cycloalkyl radical with 2 to 40 carbon atoms, preferably saturated linear alkyl diols with 3 to 15 carbon atoms, particularly preferably with 3 to 10 carbon atoms, most particularly preferably with 6 to 10 carbon atoms and especially with 7 to 10 carbon atoms, as well as a radical (II)

(II)

wherein Al denotes branched or linear, saturated or unsaturated alkyl or cycloalkyl radicals with 2 to 40 carbon atoms and —O—Ar—O— denotes an aromatic radical with 12 to 24 carbon atoms derived from a bisphenol, preferably bisphenol A, bisphenol TMC or bisphenol M.

T may also vary within the polymer molecule.

The polycarbonates obtainable by the process according to the invention may intentionally be branched in a controlled way by using small amounts of branching agents. Examples of suitable branching agents are:
phloroglucinol,
4,6-dimethyl-2,4,6-tri-(4-hydroxyphenyl)heptane,
1,3,5-tri-(4-hydroxyphenyl)benzene,
1,1,1-tri-(4-hydroxyphenyl)ethane,
tri-(4-hydroxyphenyl)phenylmethane,
2,2-bis-[4,4-bis-(4-hydroxyphenyl)cyclohexyl]propane,
2,4-bis-(4-hydroxyphenylisopropyl)phenol,
2,6-bis-(2-hydroxy-5'-methylbenzyl)-4-methylphenol,
2-(4-hydroxyphenyl)-2-(2,4-dihydroxyphenyl)propane,
hexa-(4-(4-hydroxyphenylisopropyl)phenyl)orthoterephthalic acid ester,
tetra-(4-hydroxyphenyl)methane,
tetra-(4-(4-hydroxyphenylisopropyl)phenoxy)methane,
isatin biscresol,
pentaerythritol,
2,4-dihydroxybenzoic acid,
trimesic acid,
cyanuric acid,
1,4-bis-(4',4"-dihydroxytriphenyl)methyl)benzene and
α,α'α"-tris-(4-hydroxyphenyl)-1,3,4-triisopropenylbenzene.

1,1,1-tri-(4-hydroxyphenyl)ethane and isatin biscresol are particularly preferred.

These branching agents may be added at any appropriate stage of the process, i.e. in the first stage in the production of the low molecular weight aliphatic polycarbonates as well as in the second stage in the melt transesterification for the production of the high molecular weight aliphatic polycarbonates.

The branching agents that are optionally co-used in an amount of 0.02 to 3.6 mole %, preferably 0.05 to 2.5 mole %, referred to the sum total of aliphatic diols and low molecular weight aliphatic polycarbonates, are preferably employed together with the aliphatic diols and the low molecular weight aliphatic polycarbonates in the second stage.

The aliphatic polycarbonates according to the invention may contain chain terminators. The corresponding chain terminators are known inter alia from EP 335 214 A (U.S. Pat. Nos. 4,977,233 and 5,091,482 its indicated equivalents are incorporated herein by reference) and DE 3 007 934 A. Monophenols as well as monocarboxylic acids may be mentioned by way of example but not exclusively as suitable chain terminators. Suitable monophenols are phenol, alkylphenols such as cresols, p-tert.-butylphenol, p-n-octylphenol, p-iso-octylphenol, p-n-nonylphenol and p-isononylphenol, halogenated phenols such as p-chlorophenol, 2,4-dichlorophenol, p-bromophenol and 2,4,6-tribromophenol, and/or their mixtures.

Preferred are p-tert.-butylphenol or phenol, the latter being particularly preferred.

Suitable monocarboxylic acids are benzoic acid, alkylbenzoic acids and halogenated benzoic acids.

After the second stage of the process according to the invention it is possible to add the chain terminators at any point in the reaction, preferably at the start of the reaction, and the addition may be split into several portions. The amount of chain terminators may be 0.4 to 17 mole %, preferably 1.3 to 8.6 mole % (referred to the sum total of aliphatic diols and low molecular weight aliphatic polycarbonates).

The second stage of the process according to the invention may be carried out continuously or batchwise.

The second stage of the process according to the invention need not be physically connected to the first stage of the process according to the invention as regards apparatus as long as the low molecular weight polycarbonates that are obtainable by the first stage of the process according to the invention are used for the production of the high molecular weight aliphatic polycarbonates.

The second stage of the process according to the invention is generally carried out at temperatures of 150° to 320° C., preferably 160° to 280° C. and particularly preferably 180° to 220° C., and at pressures of 1 bar to 0.001 bar (high vacuum).

The second stage of the process according to the invention is carried out for example in such a way that a mixture of low molecular weight aliphatic polycarbonate and optionally aliphatic diol and diaryl carbonate is melted in an inert gas atmosphere in the presence of a catalyst at temperatures of 75° to 225° C., preferably 105° to 235° C., particularly preferably 120° to 190° C., under normal pressure and for 0.1 to 5 hours. Condensation is then carried out by reducing the pressure and raising the temperature to 150°–320° C., preferably 160°–280° C., particularly preferably 180°–220° C., and the hydroxyaryl component that is formed is distilled off. The pressure is selected so that the hydroxyaryl component may be distilled off without any problem.

The polycarbonates obtained have mean weight-average molecular weights $M_w$ of 20,000 to 500,000 g mole$^{-1}$, preferably 25,000 to 300,000 g mole$^{-1}$ and particularly preferably 30,000 to 200,000 g mole$^{-1}$.

Auxiliary substances and reinforcing agents may be added to the aliphatic polycarbonates according to the invention in order to alter the properties. Suitable auxiliary substances and reinforcing agents include inter alia: thermal stabilizers and UV stabilisers, flow auxiliaries, mold release agents, flameproofing agents, pigments, finely comminuted minerals, fiberous substances, e.g. alkyl and aryl phosphites, phosphates, phosphanes, low molecular weight carboxylic acid esters, halogenated compounds, salts, chalk, quartz flour, glass fibers and carbon fibers, pigments and combinations thereof. Such compounds are described for example in WO 99/55772, pp. 15–25, and in "Plastics Additives", R. Gächter and H. Müller, Hanser Publishers 1983.

The aliphatic polycarbonates obtainable by the process according to the invention may be processed in the usual way in conventional machinery, for example in extruders or injection-molding machines, into suitable molded articless, for example films or sheets.

The present invention also provides for the use of the aliphatic polycarbonates and/or the corresponding molded articles according to the invention for the production of molded articles and extrudates, in particular optical articles, films and sheets, as well as the corresponding molded articles, preferably optical articles, produced from the aliphatic polycarbonates according to the invention.

Examples of this use include the following, without however being restricted thereto: safety panels, extrusion and solution films for displays or electric motors, production of light-permeable plates, production of traffic light housings or vehicle number plates, production of precision injection-molded parts, optical applications such as optical storage media (CD, DVD, MD), production of lamps/lights, sports articles, applications in the automobile sector, domestic appliances and electrical and electronics equipment, or for other uses such as for example:

1. Safety panels, which as is known are required in many areas of housings, vehicles and aircraft, as well as helmet shields
2. Production of foils, especially ski foils.
3. Production of molded articles (see for example U.S. Pat. 2,964,794A), for example 1- to 5-gallon water containers.
4. Production of light-permeable panels, in particular hollow-chamber panels, for example for covering buildings such as railways, greenhouses and lighting installations.
5. Production of optical data storage media.
6. Production of traffic light housings or vehicle number plates.
7. Production of foams (see for example DE-B 1 031 507).
8. Production of fibres and threads (see for example DE-B 1 137 167 and DE-A 1 785 137).
9. As translucent plastics materials with a glass fibre content for light technology purposes (see for example DE-A 1 554 020).
10. As translucent plastics materials containing barium sulfate, titanium dioxide and/or zirconium oxide and/or organic polymeric acrylate rubbers (EP-A 634 445, EP-A 269324) for the production of light-permeable and light-scattering molded parts.
11. Production of precision injection-molded small parts, such as for example lens mountings. For this purpose polycarbonates are used that contain glass fibers, which optionally may additionally contain about 1–10 wt. % of $MoS_2$, referred to the total weight.
12. Production of optical instrument parts, in particular lenses for photographic cameras and film cameras (see for example DE-A 2 701 173).
13. As light-transmission carriers, in particular as light-conducting cables (see for example EP-A1 0 089 801).
14. As electrical insulation materials for electrical leads and for plug housings as well as plug-and-socket connectors.
15. Production of mobile telephone housings having improved resistance to perfume, shaving water and sweat.
16. Network interface devices.
17. As carrier material for organic photoconductors.
18. Production of lamps/lights, e.g. headlamps, scattered light panels or internal lenses.
19. For medical applications, e.g. oxygenators, dialysis equipment.
20. For foodstuff applications, e.g. bottles, utensils and chocolate molds.
21. For applications in the automobile sector where contact with fuels and lubricants may occur, such as for example bumpers, optionally in the form of suitable blends with ABS or suitable rubbers.
22. For sports articles, such as for example slalom poles or ski shoe fastenings.
23. For household articles, for example kitchen sink units and letter box housings.
24. For housings, for example electrical distribution cabinets.
25. Housings for electric toothbrushes and hairdryers.
26. Transparent washing machine "bullseyes" with improved resistance to detergents.
27. Protective goggles, optical correction glasses.
28. Lamp coverings for kitchen appliances with improved resistance to kitchen atmospheres, in particular oil vapours.
29. Packaging films for medicaments.
30. Chip boxes and chip carriers.
31. For other applications, such as for example stall-feeding doors or animal cages.

EXAMPLES

The following examples are intended to illustrate the present invention but do not restrict the latter in any way.

The relative solution viscosity was determined in dichloromethane at a concentration of 5 g/l at 25° C.

All data relating to the hydroxyl numbers (OH no.) refer to mg KOH/g of substance. They were measured according to DIN EN ISO 4629.

The $M_w$ is determined using a solution of 5 g of polymer per 1 litre of methylene chloride via a gel permeation chromatography measurement with connected scattered light detection.

Comparison Example 1

The aim is to produce a high molecular weight aliphatic 1,6-hexanediol polycarbonate according to DE 1 031 512.

80.00 g (0.67 mole) of 1,6-hexanediol, 84.00 g (0.71 mole) of diethyl carbonate and 0.03 g of 21% sodium ethylate are weighed out into a stirred vessel with a distillation attachment. The vessel is freed from atmospheric oxygen by application of a vacuum and flushing with nitrogen (three times) and the mixture is heated and stirred at 100°–130° C. for 30 minutes under nitrogen. The ethanol formed is distilled off. The temperature is then raised to 200° C. and a vacuum of 40 mbar is applied. After 3 hours 0.20 g of phenyl chloroformate is added and the mixture is stirred for a further 3 hours at 250° C. under a high vacuum. After completion of the reaction a white, non-transparent polycarbonate is obtained with an OH number of 2 and a mean molecular weight of 25,420 g mole$^{-1}$ (relative solution viscosity 1.30).

The synthesis of a corresponding viscoplastic polycarbonate with a higher relative viscosity is not possible in this way.

Comparison Example 2

The aim is to produce a high molecular weight aliphatic 1,6-hexanediol perhydro-bisphenol A polycarbonate according to DE 1 031 512.

59.60 g (0.50 mole) of 1,6-hexanediol, 23.1 g (0.10 mole) of perhydro-bisphenol A, 84.85 g (0.71 mole) of diethyl carbonate and 0.03 g of 21% sodium ethylate are weighed out into a stirred vessel with a distillation attachment. The vessel is freed from atmospheric oxygen by application of a vacuum and flushing with nitrogen (three times) and the mixture is heated and stirred at 100°–130° C. for 30 minutes under nitrogen. The ethanol formed is distilled off. The temperature is then raised to 200° C. and a vacuum of 40 mbar is applied. After 3 hours 0.20 g of phenyl chloroformate is added and the mixture is stirred for a further 3 hours at 250° C. under a high vacuum. After completion of the reaction a transparent product is obtained with an OH number of less than 13 and a mean molecular weight of 6532 g mol$^{-1}$ (relative solution viscosity 1.12).

The synthesis of a corresponding viscoplastic polycarbonate with a higher relative viscosity and thus molecular weight is not possible in this way.

Example 1

The aim is to produce a high molecular weight aliphatic 1,6-hexanediol polycarbonate.

94.14 g (0.8 mole) of 1,6-hexanediol, 158.04 g (0.74 mole) of diphenyl carbonate and 0.64 g of bis(tributyltin)

oxide are weighed out into a stirred vessel with a distillation attachment. The vessel is freed from atmospheric oxygen by application of a vacuum and flushing with nitrogen (three times) and the mixture is heated and stirred at 180°–185° C. for one hour under nitrogen. The phenol distillation starts at approximately 181° C. The temperature is raised stepwise to 210° C. so that the phenol can be constantly distilled off without any problem. As soon as the reaction temperature falls a vacuum is applied, which is slowly raised to 0.01 mbar so that last residues of phenol can also be removed from the reaction mixture. The overall reaction time was 16 hours. The reaction mixture was cooled to 80° C. and only then aerated. The OH number was measured and found to be 56 mg KOH/g. 186.30 g of previously produced hexanediol polycarbonate (OH no.=56, 0.1 mole), 22.92 g (0.107 mole) of diphenyl carbonate and 0.203 g ($8.0\times10^{-4}$ mole) of dibutyltin oxide are weighed out into a stirred vessel with a distillation attachment. The vessel is freed from atmospheric oxygen by application of a vacuum and flushing with nitrogen (three times) and the mixture is melted at 150°. The temperature is raised to 190° C. and the mixture is stirred for 60 minutes. The temperature is next reduced to 160° C. and the pressure is then lowered to 100 mbar within 30 minutes. The phenol formed is distilled off over 60 minutes. The vacuum is then improved stepwise to 50 mbar within 90 minutes without the head temperature rising. The pressure is reduced to 10 mbar within 90 minutes without any increase in the head temperature, and distillation is continued for a further 90 minutes at 190° C. The mixture is finally distilled for a further 20 minutes at 190° C. under a high vacuum. A white, viscoplastic product is obtained having a mean molecular weight of 50,600 g mole$^{-1}$ and an OH number of less than 1 (relative solution viscosity 1.540).

Example 2

The aim is to produce a high molecular weight aliphatic 1,6-hexanediol/Dianol-220® polycarbonate.

94.14 g (0.8 mole) of 1,6-hexanediol, 158.04 g (0.74 mole) of diphenyl carbonate and 0.64 g of bis(tributyltin) oxide are weighed out into a stirred vessel with a distillation attachment. The vessel is freed from atmospheric oxygen by application of a vacuum and flushing with nitrogen (three times) and the mixture is heated and stirred at 180°–185° C. for one hour under nitrogen. The phenol distillation starts at approximately 181° C. The temperature is raised stepwise to 210° C. so that the phenol can be constantly distilled off without any problem. As soon as the reaction temperature falls a vacuum is applied, which is slowly raised to 0.01 mbar so that last residues of phenol can also be removed from the reaction mixture. The overall reaction time was 16 hours. The reaction mixture was cooled to 80° C. and only then aerated. The OH number was measured and found to be 56 mg KOH/g.

17.63 g of previously produced hexanediol polycarbonate (OH no.=56, 0.0096 mole), 13.75 g (0.0642 mole) of diphenyl carbonate, 17.54 g (0.0504 mole) of Dianol-220® and 0.0122 g ($4.8\times10^{-5}$ mole) of dibutyltin oxide are weighed out into a stirred vessel with a distillation attachment. The vessel is freed from atmospheric oxygen by application of a vacuum and flushing with nitrogen (three times) and the mixture is melted at 150° C. The temperature is raised to 190° C. and the mixture is stirred for 60 minutes. The temperature is next reduced to 160° C. and the pressure is then lowered to 100 mbar within 30 minutes. The phenol formed is distilled off over 60 minutes. Following this the vacuum is improved stepwise to 50 mbar within 90 minutes without the head temperature rising. The pressure is reduced to 10 mbar within 90 minutes without any increase in the head temperature, and distillation is continued for a further 90 minutes at 190° C. The mixture is finally distilled for a further 20 minutes at 190° C. under a high vacuum. A transparent viscoplastic product is obtained having a mean molecular weight of 55,200 g mole$^{-1}$ and an OH number of less than 2 (relative solution viscosity 1.514).

Example 3

The aim is to produce a high molecular weight aliphatic 1,6-hexanediol perhydro-bisphenol A polycarbonate.

94.14 g (0.8 mole) of 1,6-hexanediol, 158.04 g (0.74 mole) of diphenyl carbonate and 0.64 g of bis(tributyltin) oxide are weighed out into a stirred vessel with a distillation attachment. The vessel is freed from atmospheric oxygen by application of a vacuum and flushing with nitrogen (three times) and the mixture is heated and stirred at 180°–185° C. for one hour under nitrogen. The phenol distillation starts at approximately 181° C. The temperature is raised stepwise to 210° C. so that the phenol can be constantly distilled off without any problem. As soon as the reaction temperature falls a vacuum is applied, which is slowly raised to 0.01 mbar so that last residues of phenol can also be removed from the reaction mixture. The overall reaction time was 16 hours. The reaction mixture was cooled to 80° C. and only then aerated. The OH number was measured and found to be 56 mg KOH/g.

51.41 g of previously produced hexanediol polycarbonate (OH no.=56, 0.028 mole), 22.92 g (0.107 mole) of diphenyl carbonate, 17.31 g (0.072 mole) of perhydro-bisphenol A and 0.0203 g ($8.0\times10^{-5}$ mole) of dibutyltin oxide are weighed out into a stirred vessel with a distillation attachment. The vessel is freed from atmospheric oxygen by application of a vacuum and flushing with nitrogen (three times) and the mixture is melted at 150° C. The temperature is raised to 190° C. and the mixture is stirred for 60 minutes. The temperature is next reduced to 160° C. and the pressure is then lowered to 100 mbar within 30 minutes. The phenol formed is distilled off over 60 minutes. Following this the vacuum is improved stepwise to 50 mbar within 90 minutes without the head temperature rising. The pressure is reduced to 10 mbar within 90 minutes without any increase in the head temperature, and distillation is continued for a further 90 minutes at 190° C. The mixture is finally distilled for a further 20 minutes at 190° C. under a high vacuum. A transparent viscoplastic product is obtained having a mean molecular weight of 46,600 g mole$^{-1}$ and an OH number of less than 2 (relative solution viscosity 1.481).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polycarbonate containing at least one aliphatic polycarbonate block, comprising (i) producing a low molecular weight aliphatic polycarbonate and (ii) condensing the low molecular weight aliphatic polycarbonate with diaryl carbonate in a melt transesterification process to form a high molecular weight aliphatic polycarbonate.

2. The process according to claim 1, wherein the melt transesterification is carried out in the presence of a, catalyst.

3. The process according to claim 2, wherein the catalyst is dibutyltin oxide.

4. The process according to claim 1, wherein the melt transesterification is carried out in the presence of at least one aliphatic diol.

5. An aliphatic polycarbonate having a weight-average molecular weight $M_w$ of at least 30,000 g moles$^-$, comprising structural units conforming to formula (VII)

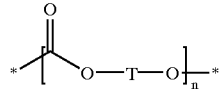 (VII)

wherein n is a number between 1 and 100 and

T independently of one another denotes a branched or linear, saturated or unsaturated alkyl or cycloalkyl radical with 2 to 40 carbon atoms, or a radical conforming to (II)

 (II)

wherein Al denotes branched or linear, saturated or unsaturated alkyl or cycloalkyl radicals with 2 to 40 carbon atoms and —O—Ar—O— denotes an aromatic radical with 12 to 24 carbon atoms.

6. The aliphatic polycarbonate prepared by the process of claim 1.

7. The aliphatic polycarbonate prepared by the process of claim 2.

8. A molded article comprising the aliphatic polycarbonate of claim 6.

* * * * *